United States Patent [19]
Hill

[11] 4,059,124
[45] Nov. 22, 1977

[54] VALVED STOPPER FOR A URINE BOTTLE

[76] Inventor: Edward J. Hill, 1660 Lochridge Road, Bloomfield Hills, Mich. 48013

[21] Appl. No.: 652,241

[22] Filed: Jan. 26, 1976

[51] Int. Cl.[2] ........ F16K 17/36

[52] U.S. Cl. ........ 137/38; 4/110; 4/128; 137/519

[58] Field of Search ........ 4/110, 112, 113, 119, 4/120, 128, 138, 142, DIG. 5; 128/275, 294, 295; 137/38, 519; 215/260, 364

[56] References Cited

U.S. PATENT DOCUMENTS

| | | | |
|---|---|---|---|
| 1,628,441 | 5/1927 | Soresi | 137/519 X |
| 2,202,123 | 5/1940 | Strode | 137/519 |
| 3,533,528 | 10/1970 | Rubin | 215/364 |

FOREIGN PATENT DOCUMENTS

| | | | |
|---|---|---|---|
| 1,172,263 | 11/1969 | United Kingdom | 4/110 |

*Primary Examiner*—Robert G. Nilson
*Attorney, Agent, or Firm*—Krass & Young

[57] ABSTRACT

A valved stopper insertable into the inlet passage of a urine bottle permits only unidirectional flow into the bottle to prevent accidental spillage. The stopper has a generally tubular body which retains a valve member. The valve member is free to move in the tube under gravitational influence. When the urine bottle is tilted or inverted the valve member moves toward the inlet opening and sealingly engages the inner surface of the tube to block off flow from the bottle.

12 Claims, 4 Drawing Figures

Fig-1
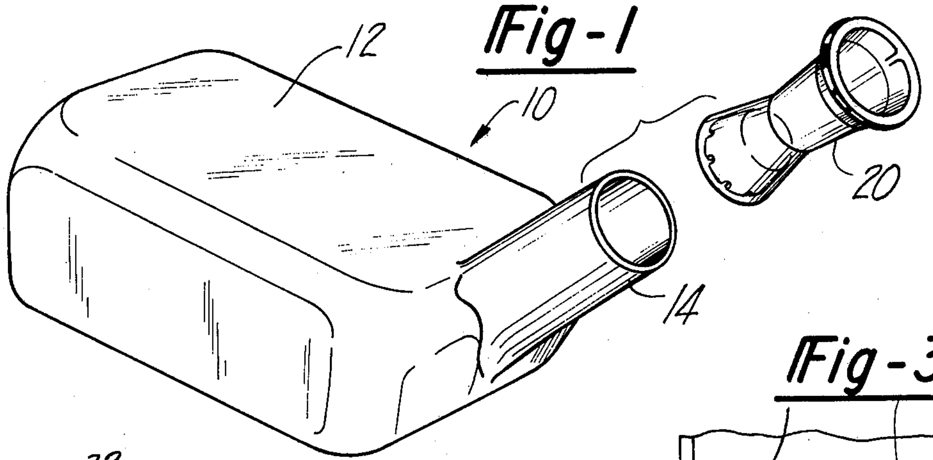
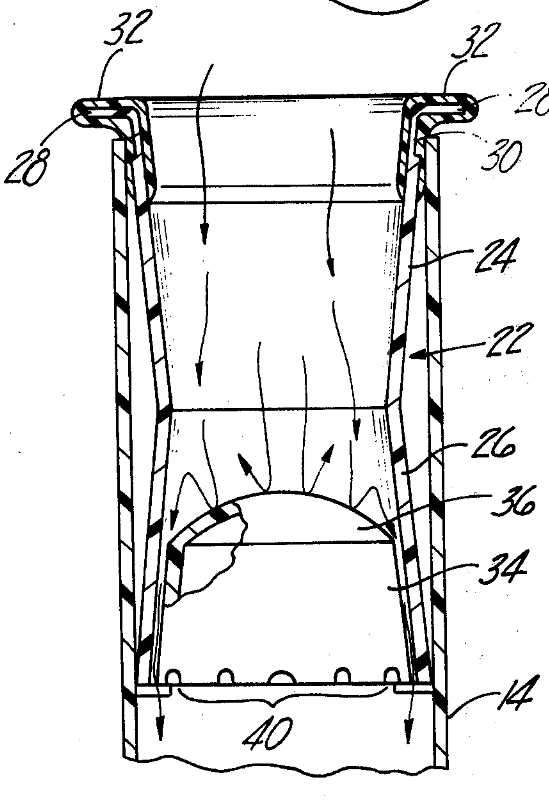
Fig-2
Fig-3
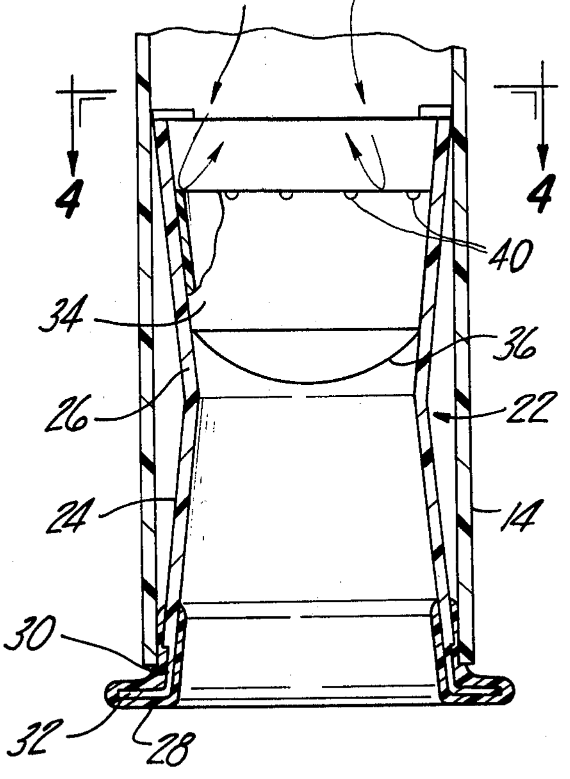
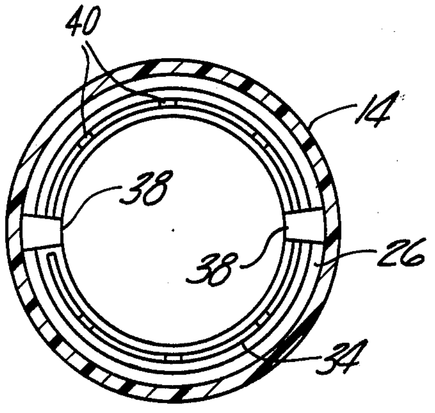
Fig-4

VALVED STOPPER FOR A URINE BOTTLE

INTRODUCTION

This invention relates to a stopper for urine bottles or the like and more particularly to a valved stopper allowing only unidirectional flow into the bottle.

BACKGROUND OF THE INVENTION

Urine bottles are commonly used by people unable to gain access to normal facilities, such as a bedridden patient in a hospital. The conventional urine bottle is constructed with a generally rectangular container body having a circular spout or inlet extending from the body at an acute angle with respect to the longitudinal axis of the body. This form of bottle is stable and well supported when placed on its side with the inlet directed upwardly. But if stood on end, as is often the case, the bottle is less stable and easily knocked over. If the bottle is overturned, without the patient or attendant having beforehand capped or plugged the inlet opening, accidental spillage may occur. Spillage presents a health problem, as well as requiring an unpleasant clean-up task.

Urine bottles have therefore been devised to avoid the possibility of accidental spillage by providing a one-way flow valve in the inlet. One type of bottle employs a flap valve biased to remain closed until caused to open by an incoming flow. The flap valve, however, has been attended by several disadvantages in this application. One is the problem of air building up within the container body and increasing the internal pressure to make it difficult for the valve to open. Another problem concerns the undesirable splash back of the liquid toward the user which may occur as fluid entering the bottle contacts the upper surface of the flap.

It is therefore desirable to provide a one-way valve which will preclude accidental spillage irrespective of the orientation of the bottle and will overcome the disadvantages associated with earlier designs.

BRIEF SUMMARY OF THE INVENTION

The present invention is directed to a valved stopper for a urine bottle or the like which may be detachably mounted in the inlet of the bottle. The stopper readily permits fluid to flow into the bottle, but acts to positively prevent fluid outflow and thereby guard against accidental spillage.

Broadly, valves formed in accordance with the invention employ a tubular body having upper and lower segments. The upper segment acts as a receiving chamber and is dimensioned at its uppermost portion to be closely received within the inlet opening of the bottle so that the body extends into the bottle. An outward flange or shoulder formed at the end of the upper segment supports the tubular body within the bottle inlet. The lower segment is flared outwardly from the point of juncture with the upper segment and encloses a complementary-shaped, gravity-controlled valve member. When the bottle is tipped or inverted the valve member moves toward the inlet opening, where it sealingly engages the inner surface of the lower segment to positively block off flow from the bottle.

In a preferred embodiment of the invention, which will be subsequently disclosed in detail, the upper portion of the valved stopper is embedded in a matrix of resilient material. This provides two features: first to create a resilient seal between the valved stopper and inlet opening, and second to mitigate the otherwise harsh surfaces which would contact sensitive body members and could cause irritation or ulceration.

Another feature of the invention is the provision of an upper convex surface on the valve member which outwardly deflects incoming fluid to minimize fluid splash back.

Other features, modifications and additions to the invention will be made apparent by the following description of a specific embodiment.

BRIEF DESCRIPTION OF THE DRAWINGS

FIG. 1 is a perspective view of a conventional urine bottle and a valved stopper embodying the present invention shown ready for insertion into the bottle inlet;

FIG. 2 is a sectional view of the bottle inlet of FIG. 1 shown provided with a valved stopper in position to allow fluid to pass into the bottle;

FIG. 3 is an inverted representation of FIG. 2 showing the valved stopper in operation to block flow from the bottle; and FIG. 4 is a sectional view taken along line 4—4 of FIG. 3 illustrating the stop tabs affixed to the valved stopper body.

DETAILED DESCRIPTION OF THE SPECIFIC EMBODIMENT APPARATUS

FIG. 1 shows a conventional urine bottle 10 in common use in hospitals and other care-type facilities. The bottle 10 has a generally rectangular container body 12 and a spout or inlet 14 formed at an acute upward angle with respect to the longitudinal axis of the container body and in communication therewith.

The urine bottle 10 is shown in FIG. 1 in a stable posture. In this position the bottle is well supported and is least susceptible to being knocked over or upset. However, as may be readily seen, the bottle 10 could also be supported on end where, although stable, it could be easily upset. It is a common mistake of patients and attendants to place the bottle 10 on end when not in use. If this is done without having beforehand plugged or capped the inlet 14, a consequent bumping or jarring of the bottle 10 may cause it to overturn and spill out its contents. Spillage of human refuse presents a substantial health problem, in addition to an unpleasant clean-up task.

To avoid the above-described situation the urine bottle 10 may be provided with a valved stopper 20 which will allow only undirectional flow into the bottle.

In FIG. 2 the valved stopper is shown in the bottle inlet 14 in position to allow fluid to pass into the bottle. The valved stopper comprises a generally tubular body 22, which is preferably formed of styrene plastic. The tubular body 22 is divided into upper and lower segments 24 and 26 respectively.

The upper segment 24 acts as a receiving chamber and is preferably in the form of an inverted frustum. The upper-most portion of the upper segment 24 is dimensioned to be closely received within the opening of the bottle inlet 14 to allow a close fit therein. An outward flange or shoulder 28 is formed adjacent the top edge of the upper segment 24 to support the valved stopper 20 in the inlet 14.

To provide a resilient seal between the bottle inlet 14 and valved stopper 20, the upper portion of the stopper is embedded in a thin matrix of resilient material 32, preferably molded vinyl. In addition to the seal, the matrix 32 mitigates the otherewise harsh surfaces on the valved stopper 20 to protect against ulceration of sensitive body members. A groove 30 is formed in the outer surface of the upper segment 24 below the flange 28 to secure the matrix 32 in position.

The lower segment 26 of the tubular body 22 is tapered outwardly from the point of juncture with the upper segment 24. In the preferred form, the lower segment 26 is also in the form of a frustum.

Freely disposed within lower segment 26 is a complementary shaped, tapering, hollow valve member 34. The valve member 34 is closed at its top by a convex surface 36 while being open at its lower outwardly tapering end as shown. It is retained within the lower segment by a pair of stops 38, as shown in FIG. 4, which ar attached adjacent the lower edge of the lower segment 26. The lower periphery of the valve member 34 has formed within it a plurality of scallops 40. The scallops 40 provide improved ventilation of air displaced by fluid entering the container body 12 to reduce air build-up and increased internal pressure within the container body.

As best illustrated in FIG. 3, the complementary shape of the valve member 34 to the lower segment 26 allows it to sealingly engage the inner surface of the lower segment when the valve member is caused to move toward the upper segment 24 by gravitational force. This engagement positively locks the flow of any fluid out of the container body 12 through the tubular body 22. Acting in cooperation with the secure fit between the inlet 14 and upper portion of the upper segment 24, flow of fluid from the bottle 10 is precluded.

To minimize the possibility of the valve member 34 locking or sticking in the neck defined by the union of the upper segment 24 and lower segment 26, the outward taper of the lower section 26 should be kept rather shallow, on the order of 5°.

OPERATION

When the bottle 10 is positioned as shown in FIG. 2 the valve member 34 rests against the stops 38 in its lowermost position to allow unhindered flow into the bottle. Fluid entering the bottle is received in the upper segment 24, passed into the lower segment 26 where is strikes the convex top surface face 36 of the valve member 34 and is deflected outwardly against the walls of the lower segment 26, and deflected again from the walls of the lower segment into the fluid passage between the valve member 34 and lower segment 26 into the bottle. The provision of the convex top surface 36 substantially reduces splash back of the fluid from the valve member 34.

When the bottle 10 is tilted or inverted in the manner shown in FIG. 3, gravitational force moves the valve member 34 into position to block outward flow. As described, the valve member 34 is shaped complementary to the lower segment 26 to sealingly engage the inner surface of the lower segment. This seal, in cooperation with the resilient seal between the opening of the inlet 14 and upper segment 24, cuts off all means by which fluid may escape from the bottle.

When the bottle 10 is to be emptied of its contents, the valved stopper 20 is pulled from the inlet 14. The valved stopper may then either be disposed of or washed for reuse.

In summary, the present invention is seen to provide a device simple in design so as to be low in cost and readily manufacturable, but able to perform its perscribed objectives without the difficulties associated with prior art designs.

The description of the invention in a specific embodiment is for the purposes of illustration only and is not intended to be limiting. Widely varying embodiments are possible without departing from the scope of the present invention.

The embodiments of the invention in which an exclusive property or privilege is claimed are defined as follows:

1. A valved stopper for a urine bottle of the type having a container body and an inlet extending from the container body and in communication therewith, comprising:

a tubular body having an upper segment adjoining a lower segment, the upper segment being dimensioned at its uppermost portion to be closely received in the inlet opening to provide a close fit therein, the lower segment being tapered outwardly from the point of juncture with the upper segment;

means for retaining the tubular body within the bottle inlet; and a gravity controlled valve member, having a hollow tapered shape complementary to the lower segment and open at its lower end, freely disposed within the lower segment and retained therein by stop means on the lower segment, the valve member being adapted to sealingly engage the inner surface of the lower segment when directed toward the inlet opening and thereby block flow from the bottle, whereby the open lower end of said valve member is adapted to receive liquid escaping from within said bottle to urge said valve member into sealing engagement with said inner surface and act to trap said liquid and prevent escape thereof.

2. The valved stopper as defined in claim 1, wherein the means for retaining the tubular body within the bottle inlet comprises an outward flange formed adjacent the upper edge of the upper segment.

3. The valved stopper as defined in claim 2, further including a matrix of resilient material surrounding the upper portion of the upper segment and the outward flange.

4. The valved stopper as defined in claim 3, wherein the matrix of resilient material is molded vinyl.

5. The valved stopper as defined in claim 3, wherein the upper segment is in the form of an inverted frustum.

6. The valved stopper as defined in claim 5, wherein an external groove is formed in the outer surface of the upper segment adjacent the outward flange to secure the matrix of resilient material in position.

7. The valved stopper as defined in claim 1, wherein the upper surface of the valve member is substantially convex to outwardly deflect incoming fluid and thereby reduce splashback.

8. The valved stopper as defined in claim 1, further including a plurality of scallops formed in the lower edge of the valve member to improve ventilation of air displaced by fluid entering the bottle.

9. The valved stopper as defined in claim 1, wherein the lower segment is in the form of a frustum.

10. The valved stopper as defined in claim 1, wherein the stop means comprises a plurality of tabs formed on the lower edge of the lower segment and extending radially inwardly therefrom.

11. The valved stopper as defined in claim 1, wherein the stopper is formed of styrene plastic.

12. A valved stopper for a urine bottle of the type having a container body and an inlet extending from the container body and in communication therewith, comprising:

a tubular body having an upper segment shaped in the form of an inverted frustum adjoining a lower segment, the upper segment being dimensioned at its uppermost portion to be closely received in the inlet opening to provide a close fit therein, the lower segment shaped in the form of a frustum and being tapered outwardly from the point of juncture with the upper segment;

means for retaining the tubular body within the bottle inlet comprising an outward flange formed adjacent the upper edge of the upper segment;

a matrix of resilient material surrounding the upper portion of the upper segment and the outward flange and an external groove formed in the outer surface of the upper segment adjacent the outward flange to secure the matrix of resilient material in position; and a gravity controlled valve member, having a hollow, tapered shape complementary to the lower segment and open at its lower end and formed with a convexly shaped upper surface, freely disposed within the lower segment and retained therein by stop means comprised of a plurality of tabs formed on a lower edge of the lower segment, the valve member being adapted to sealingly engage the inner surface of the lower segment when directe toward the inlet opening and thereby block flow from the bottle, whereby, the open lower end of said valve member is adapted to receive liquid escaping from within said bottle to urge said valve member into sealing engagement with said inner surface and act to trap said liquid and prevent escape thereof.

* * * * *